United States Patent
Freeman et al.

[11] Patent Number: 5,931,764
[45] Date of Patent: Aug. 3, 1999

[54] WEARABLE DEVICE WITH FLEXIBLE DISPLAY

[75] Inventors: Gary A. Freeman, Newton, Mass.; David H. Freeman, Tampa, Fla.

[73] Assignee: Viztec, Inc., Tampa, Fla.

[21] Appl. No.: 09/103,481

[22] Filed: Jun. 24, 1998

[51] Int. Cl.[6] .................................................. G06F 1/16
[52] U.S. Cl. ....................... 482/4; 482/902; 364/708.1; 361/680; 361/681
[58] Field of Search ................................ 482/4, 900–902; 429/122, 127; 361/680, 679, 681, 683, 686; 364/708.1

[56] References Cited

U.S. PATENT DOCUMENTS

| | | |
|---|---|---|
| D. 305,023 | 12/1989 | Suto . |
| 4,380,699 | 4/1983 | Monnier et al. . |
| 4,704,003 | 11/1987 | Komaki et al. . |
| 4,746,787 | 5/1988 | Suto et al. . |
| 4,954,985 | 9/1990 | Yamazaki et al. . |
| 5,055,968 | 10/1991 | Nishi et al. . |
| 5,142,510 | 8/1992 | Rodda . |
| 5,305,181 | 4/1994 | Schultz ..................................... 361/680 |
| 5,315,377 | 5/1994 | Isono et al. . |
| 5,359,183 | 10/1994 | Skodlar . |
| 5,516,603 | 5/1996 | Holcombe ............................... 429/127 |
| 5,517,011 | 5/1996 | Vandenengel . |
| 5,572,401 | 11/1996 | Carroll .................................... 361/683 |
| 5,594,493 | 1/1997 | Nemirofsky . |
| 5,625,477 | 4/1997 | Wu et al. . |
| 5,636,044 | 6/1997 | Yuan et al. . |
| 5,638,194 | 6/1997 | Yamada et al. . |
| 5,657,201 | 8/1997 | Kockis ..................................... 361/686 |
| 5,682,294 | 10/1997 | Horejs, Jr. et al. . |
| 5,693,956 | 12/1997 | Shi et al. . |
| 5,703,755 | 12/1997 | Flesher et al. . |
| 5,719,744 | 2/1998 | Jenkins et al. .......................... 361/683 |
| 5,734,154 | 3/1998 | Jachimowicz et al. . |
| 5,777,903 | 7/1998 | Piosenka et al. . |
| 5,798,907 | 8/1998 | Janik ....................................... 361/683 |

OTHER PUBLICATIONS

Doane et al., "Reflective Cholesteric Liquid–Crystal Displays," *Information Display* (Dec. 1996).
Merkert, "The Scoop on Chips," *Moneycard Collector,* (Jan. 27, 1998).
Yaniv, "Reflective Cholesteric Displays," *Information Display* (Oct. 1995).
Yuan, "Bistable Reflective Cholesteric Displays,"(article— no publication name).
"Polymer–dispersed LCDs," printed from Internet on Sep. 17, 1997, http://stefan.www.media.mit.edu/people/stefan/liquid–crystals/node9.html.
"Ferroelectric LCDs," printed from Internet on Sep. 14, 1997, Published: Jun. 1992, HTML: Aug 30, 1995, file:///C/My Documents/Gary/smart card/ferro_1.htm.
"A contactless multiservice system—Technology transfer," Innovation Industries/Roland Moreno Technology, product new release, Paris, France, 3 pages, 1997.

Primary Examiner—Glenn E. Richman
Attorney, Agent, or Firm—Fish & Richardson P.C.

[57] ABSTRACT

A wearable device that includes a flexible body that can be secured around a wearer. The flexible body includes an integrated circuit, a flexible display element, and circuitry for controlling the display element.

34 Claims, 6 Drawing Sheets

WEARABLE DEVICE WITH FLEXIBLE DISPLAY

BACKGROUND OF THE INVENTION

Recently, watches and other wearable devices have begun to offer functions beyond simple display of the time. For example, some watches have incorporated keyboards and offer the ability to store and retrieve information such as addresses and phone numbers. These devices, however, remain housed in rigid and sometimes bulky housings. For an active user, such as a jogger, even the relatively minor bulk of a conventional wristwatch can be an annoyance.

SUMMARY OF THE INVENTION

The invention provides a lightweight wearable device with a practical, built-in display. The device comfortably conforms to a wearer's body and can undergo flexing of the type and magnitude experienced by a wristwatch or other wearable device such as an armband, ring, or belt during normal use and handling without permanent damage to the display element or loss of the displayed information.

In general, in one aspect, the invention features, a wearable device that includes a flexible body that can be secured around a wearer. The flexible body includes an integrated circuit, a flexible display element, and circuitry for controlling the display element.

Other embodiments may include one or more of the following features. The body may form a strap such as a wristband. The body may be made from paper, reinforced paper, cardboard or other materials. More particularly the body may be made from polyester, ABS, polycarbonate, or molded polymers such as polyvinyl chloride or santoprene.

The flexible display element may be capable of continuing to display information when electrical power is removed from the display element. The display may offer multiple colors and/or offer stereoscopic effects, for example, by incorporating a barrier strip. The device may retrieve image information stored in the integrated circuit and successively display the image information on the display element.

The device may further include a communication element such as surface contacts or a wireless communication element. The integrated circuit may use the communication element to provide smart card functions. The device may include an information storage medium in addition to the integrated circuit and/or a co-processor.

The device may include a power source. Such power source may be rechargeable, for example, by a regulator and charge controller. The device body may facilitate power source replacement. The device may include a kickstart circuit that controls power usage.

The device may include a speaker such as a piezoelectric speaker. The device may also include a microphone such as a piezoelectric microphone. The device may include sensors such as sensors that acquire physiological or pedometric data.

Advantages of the invention can include one or more of the following. By eliminating the housing for electronics and a display the invention provides a small, lightweight, and comfortable device. Incorporating smart card functionality into the device makes it ideal for use during physical activity or in other settings such as medical patient care.

Other features and advantages of the invention will be apparent from the following detailed description, and from the claims.

DESCRIPTION OF THE PREFERRED EMBODIMENTS

Figure 1:
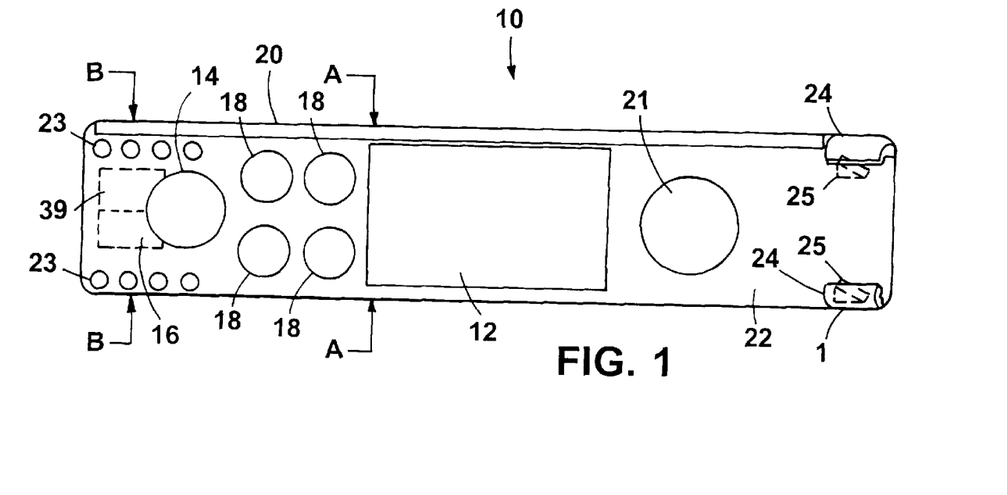
FIG. 1 is a diagram of a wearable device with a flexible display element.

Referring to FIG. 1, a wearable device 10 includes a flexible display element 12 and a strap 22 that forms the body of the device 10. The strap 22 can secure the device 10 around a person's wrist. Differently sized straps 22 can secure the device 10 around other body parts such as an ankle, leg, or finger, or around an inanimate object. The device 10 incorporates lightweight, flexible components that enable the device to conform to a given contour and offer a slim profile. The device 10 may safely undergo flexing of the type and magnitude normally experienced by watches, anklets, etc. during physical activity.

As shown, the strap 22 has an overmolded, flexible polymer (e.g., polyurethane) buckle 24. Strap holes 23 slide into the buckle under buckle 24 rails. A molded ramp 25 provides a latching mechanism that engages the holes. Pulling the strap 22 radially away from the wrist releases the strap 22 from the buckle 24. Alternatively, the strap 22 could use velcro, a peg and hole mechanism, or other fasteners.

The device 10 can present information via the flexible display element 12 and a thin-film flexible piezoelectric speaker 21 that offers multiple-octave sound. U.S. Pat. No. 5,115,472 to Park describes a flexible piezoelectric speaker/microphone made of polymer films, and is incorporated herein. The device 10 can receive information via input keys 18. The piezoelectric speaker/microphone 21 also enables the device 10 to receive sound information.

The device 10 can communicate with external devices, such as computer and smart card readers, via a communication element 16. The communication element 16 may be a wireless inductive loop screen-printed within the body of the device 10. The communication element 16 can enable the device 10 to process RF communication such as cellular messaging service communication.

Alternately, the communication element 16 may take the form of shielded electrical contacts. As the device 10 may be narrower than a smart card, a passive mechanical adapter may be needed to connect the device 10 to a smart card reader if the device 10 uses a contact communication element 16.

The device 10 may include a power source 14 such as a flexible thin-film lithium battery, such as Oak Ridge National Laboratories' thin-film battery. The flexible display element 12, however, does not require a power source to produce a static display.

Figure 2A:
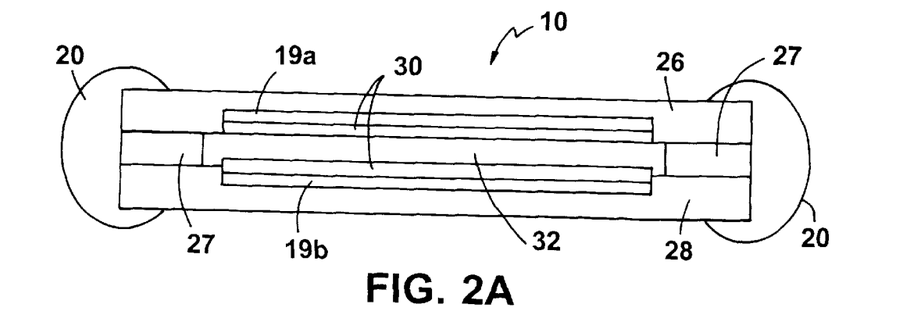
FIG. 2A is a cross-sectional view of the wearable device shown through cross section A—A of FIG. 1.
Figure 2B:
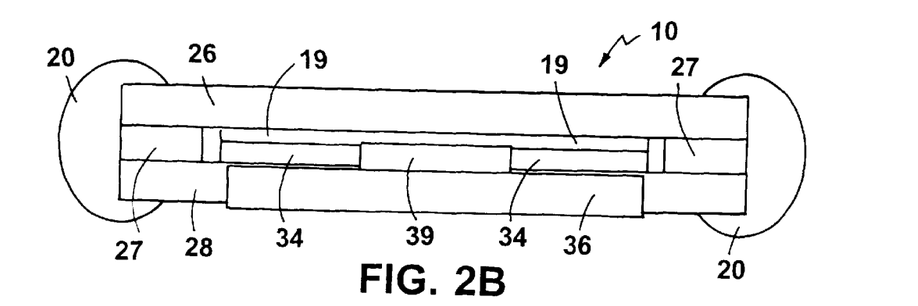
FIG. 2B is a cross-sectional view of the wearable device shown through cross section B—B of FIG. 1.

Referring to FIGS. 2A and 2B, the device 10 includes protective top 26 and bottom 28 layers and inner separator 27. The top layer 26 covers the display element with a transparent material such as PVC or clear plastic. The top 26 and bottom 28 layers may otherwise be constructed from a flexible polymer such as polycarbonate. Other embodiments could use plastic, paper, reinforced paper, cardboard, polyvinyl chloride, polyester, or ABS as layer material. Portions of the top 26 and bottom 28 layers may include printed indicia. Polymer edging 20 may be attached to the layers 26 and 28 to both add comfort to a wearer and waterproof the assembly.

Layers 26 and 28 may be molded or machined into the necessary shape to accommodate internal components. The internal components include an integrated circuit 39 mounted above a printed circuit board 36. The integrated circuit 39 can offer a variety of functions ranging from providing simple digital clock to processing video graphics information. The integrated circuit 39 may include a microprocessor 40. The size of the integrated circuit 39 and printed circuit board 36 is exaggerated in the cross-sectional view of FIG. 2B.

The flexible display element 12 can be made from a variety of materials. In one implementation, transparent electrodes 30 (indium tin oxide or other substantially clear conductive material) are deposited on the interior surfaces of the top 26 and bottom 28 layers. The electrodes may be configured to provide either a dot matrix pattern or a segmented display pattern. Z-axis conductor 34 (known polymeric material with conductivity only in the Z-axis) provides conductive paths from the printed circuit board to the electrodes which fork into electrode layers 19a and 19b that appear in the top 26 and bottom 28 layers.

The electrodes work in conjunction with liquid crystal display (LCD) film 32, which is a bi-stable or multi-stable display material that will maintain an image when power has been removed. In this way, it is unnecessary for the device 10 to have its own power source, or be connected to a power source, for the display to function. The preferred LCD material is a ferroelectric LCD. These LCDs are based on smectic liquid crystals typically of the smectic C phase with chiral behavior. When formed in a thin layer the ferroelectric material has a net polarization that is perpendicular to the viewing surface. The electrodes apply a field that rotates polarization between an "on" and an "off" state. Ferroelectric LCDs are typically sensitive to shock or bending, making them unsuitable for use in a display element 12 that can be bent and flexed. To make the ferroelectric LCD less sensitive to bending, the ferroelectric liquid crystal (FLC) is fixed to a side-chain of the polymer used to create the LCD film (e.g., as taught in Japanese Patent Document No. 63-318526) or where the FLC is dispersed in the polymer film (e.g., as taught in U.S. Pat. No. 5,638,194). As a result, the display can display information while in the flexed position (e.g., when strapped around a wearer's wrist).

Other implementations can include different display elements such as suspended particle displays or light emitting polymer displays. These display elements, however, require a power source to display images.

Figure 3:
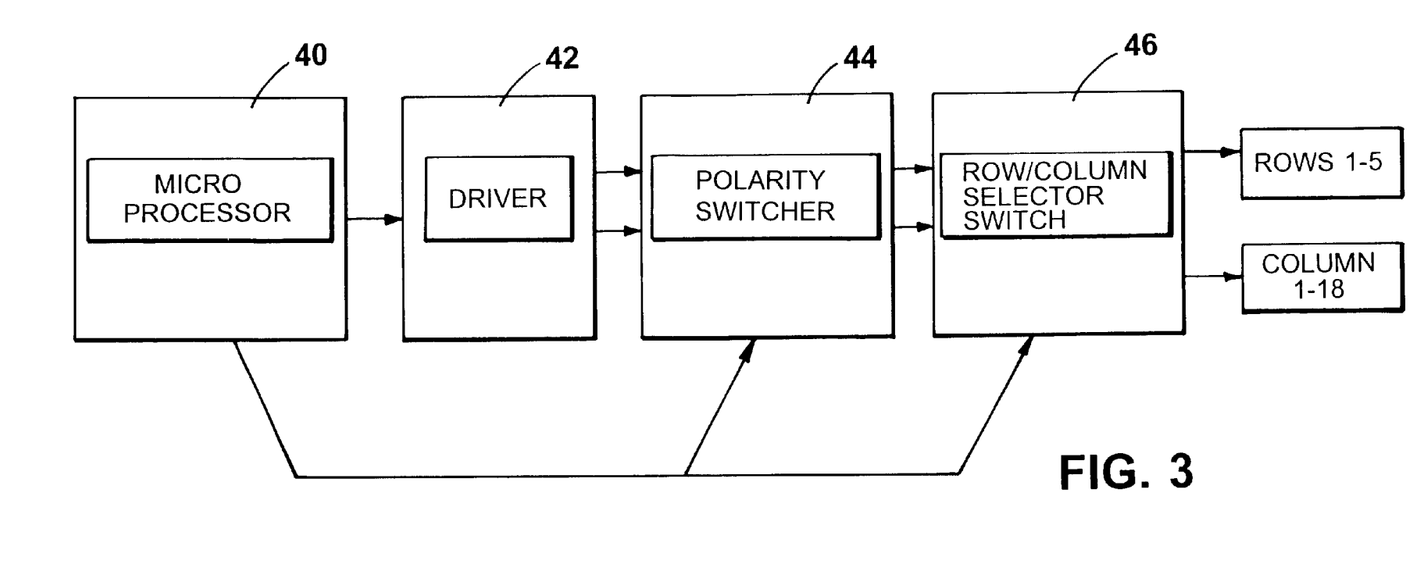
FIG. 3 is a circuit block diagram of display components.

Referring to FIG. 3, the microprocessor 40 of the integrated circuit 39 controls a driver circuit 42, which develops the voltages appropriate to activate and deactivate the display element pixels. The display driving circuitry can use a multiplexed technique used in commercial passive displays to quickly refresh the display. A power source in the device 10 or an external power source (e.g., a smart card reader) can provide the power needed by the microprocessor 40 and other stages. Polarity switcher 44 at the output of the driver circuit selects whether the row or column electrode is to receive the positive polarity. Row/column selector switch determines which specific row/column pair receives the voltages produced by the polarity switch and driver circuit. Microprocessor 40 controls the driver circuit 42, polarity switcher 44, and row/column selector switch 46. Contributing to display flexibility are polymer substrates (top and bottom layers) and the z-axis conductor for making connections between the printed circuit board and the electrodes 19. The z-axis conductor can withstand the variable compression that flexing produces.

The microprocessor 40 can also display a graphic image or a series of graphic images to produce animation sequences on the display element 12 by retrieving and displaying different stored image information. The images may form a video clip or slide-show.

Figure 4:
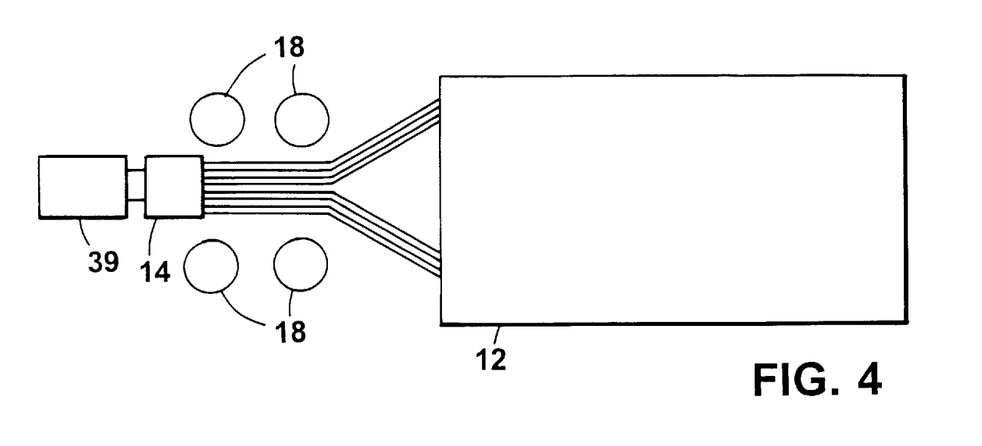
FIG. 4 is a diagram of input keys.

Referring to FIG. 4, the device 10 can receive input via input keys 18. Preferably, the input keys 18 are conductive concave "dome switches" laminated between the top and bottom layers of the device 10. Localized areas directly under the dome switches are internally laminated with a rigid material to increase the reliability of the switches and improve tactile feedback. Pressing a dome switch 18 completes an electric connection which the integrated circuit 39 senses for closure. The connection occurs over circuits screen-printed onto the bottom layer with conductive inks.

Figure 5:
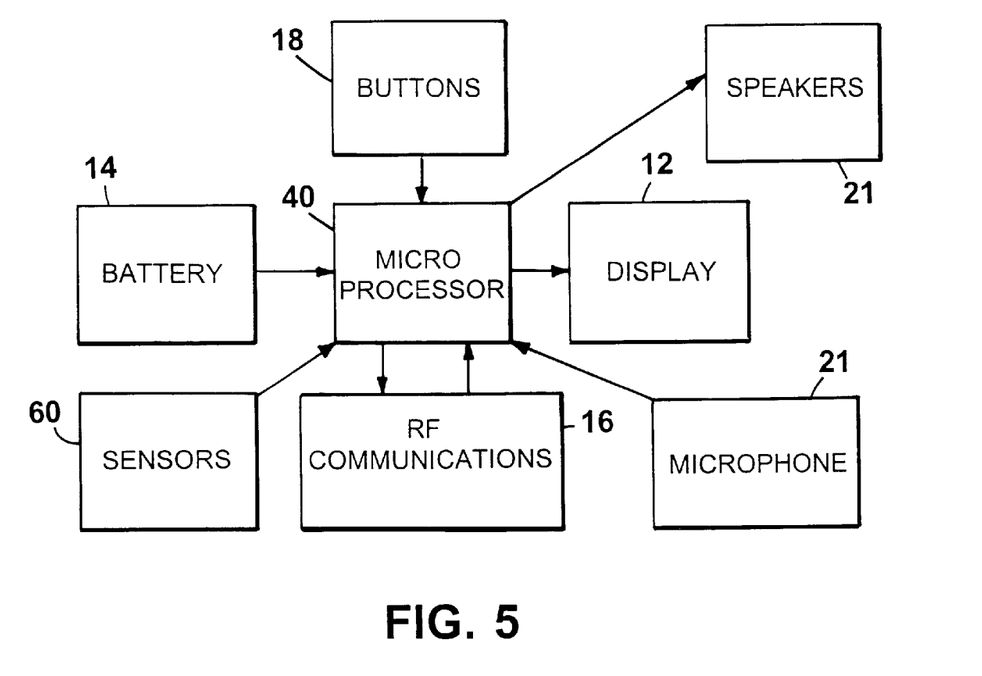
FIG. 5 is a block diagram of device components.

Referring to FIG. 5, the microprocessor 40, powered by a power source 14, controls device 10 functions. In addition to communication element 16, input keys 18, and microphone 21, the microprocessor 40 can receive input from sensors 60 that physiologically monitor a wearer of the device 10. For example, a piezoelectric polymer film such as poly vinylidene fluoride (PVDF) can acoustically collect different physiological data such as a wearer's heart rate. Other sensors can detect electrical energy, thus collecting electrocardiographic (ECG) data. The collected data can be displayed and/or stored for future download providing medical care providers with information about heart rate, abnormal heart rhythms, etc. The device 10 could also incorporate sensors such as an accelerometer to collect and display pedometer data.

The microprocessor 40 not only drives the display 12 but can also support multiple applications. For example, an application can provide compatibility with different smart card communication protocols. This feature enables the device 10 to offer smart card functions. One of the most common functions of smart cards today is as a stored-value card, which contains monetary value in an embedded microchip. Other smart card functions include providing access to ATM machines, GSM (Global System Management) cellular phones, television set top boxes, PC based applications such as internet chip card payment systems, screen phones, pay telephones, stored value systems (sometimes referred to as an "electronic purse"), public transportation systems, health insurance and health care provider systems, government benefit programs, and loyalty systems such as retailer frequent shopper.

Runners, who often prefer not to carry money or other forms of identification while jogging, can use the device as a timer, identification, a physiological monitor, and as a mechanism for paying for goods and services at the growing list of venues that offer smart card service. When the exercise session is completed, a jogger could download the collected data (e.g., heartrate) to a personal computer which could track and display the data over a long period of time.

Health care providers can use the wearable device 10 to affix patient information to a patient without discomfort. The device 10 might store and display medication and medical condition information. Quick access to such information could be critical in deciding what emergency treatment to give a patient.

The microprocessor 40 may also control a wireless communication element 16 to handle cellular messaging services. For example, the device 10 can receive an RF Short Message Service message and display the information described by the message on the display 12.

The microprocessor 40 may also handle applications such as Java applets. Applications may include compression/decompression programs that reduce the amount of information communicated.

Figure 6:
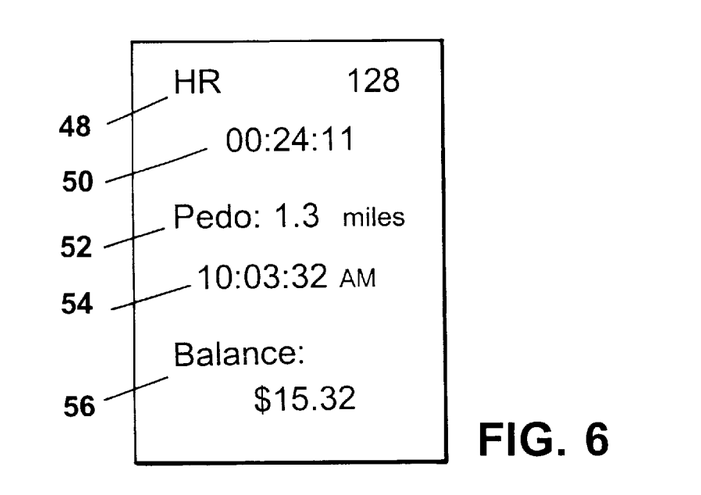
FIG. 6 is a diagram of a sample display.

Referring to FIG. 6, the flexible display element 12 may present a wearer with information that includes the wearer's heart rate 48 as sensed by device sensors, a stopwatch indicator 50, a pedometer 52, the current time 54, a balance of "smart card" money 56 retained in the device, and other information.

Figure 7:
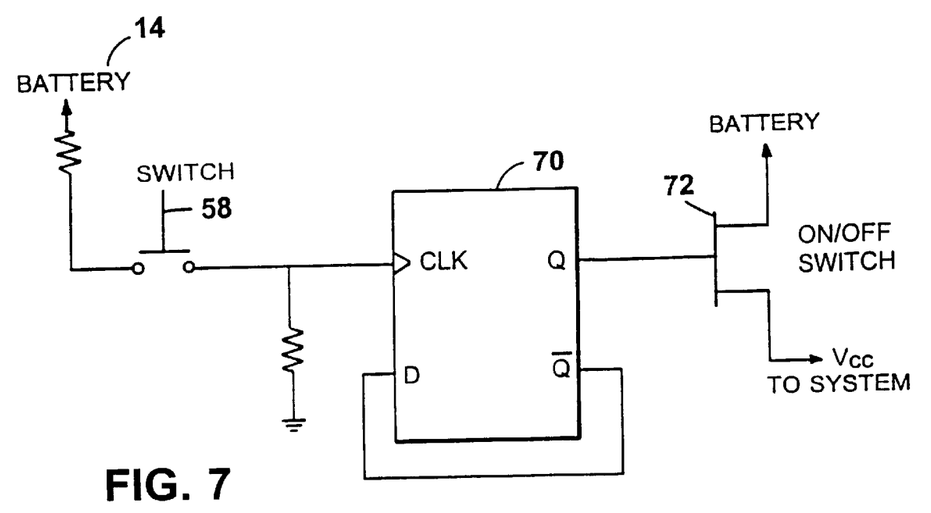
FIG. 7 is a diagram of a kickstart circuit that can control device power.

Referring to FIG. 7, as mentioned, in the preferred embodiment, the device 10 may include a power source 14. While the device 10 consumes little power, the device 10 can provide several methods of conserving energy. A kickstart circuit 70 (e.g., a flip-flop 70 that controls power source 14) connected to a user controlled contact area (e.g., one of the input keys) can control power consumption. Pressing a contact area causes the kickstart circuit 70 to initiate power output from the power source 14. The kickstart circuit can provide power for a pre-determined time period or until a subsequent pressing of the contact area. In another implementation, the contact area could instead merely connect otherwise disconnected wires to draw power from the power source 14. This later implementation requires continual pressure on the contact area to draw power. As mentioned, the display element does not need power to display a static image when the power source does not deliver power. A contact area 58 can control other functions, for example, clearing the display element.

Figure 8:
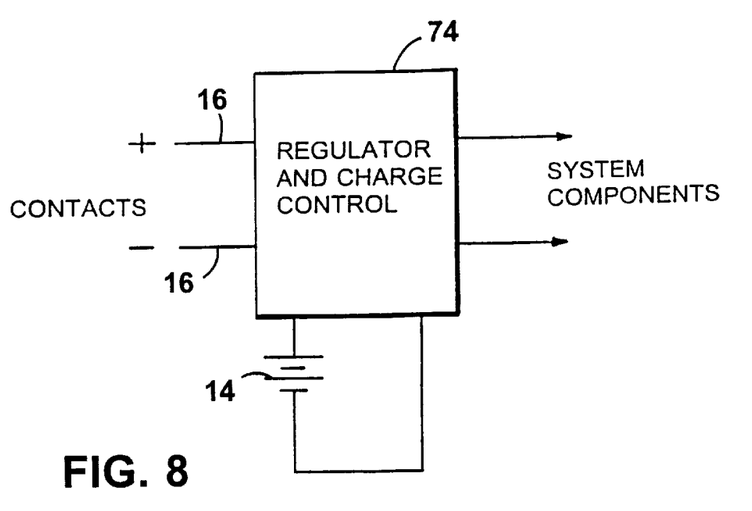
FIG. 8 is a diagram of a regulator and charge control for recharging a power source.

Recharging the power source 14 can be performed in a variety of ways. As shown in FIG. 8, the device 10 could include a regulator charge control circuit 74 that accepts current and voltage from an external power source (e.g., a smart card reader) via contacts for storage in a battery 14. A wireless device can recharge a power supply 14 from communication signals boosted to both transmit information and power.

Figure 9:
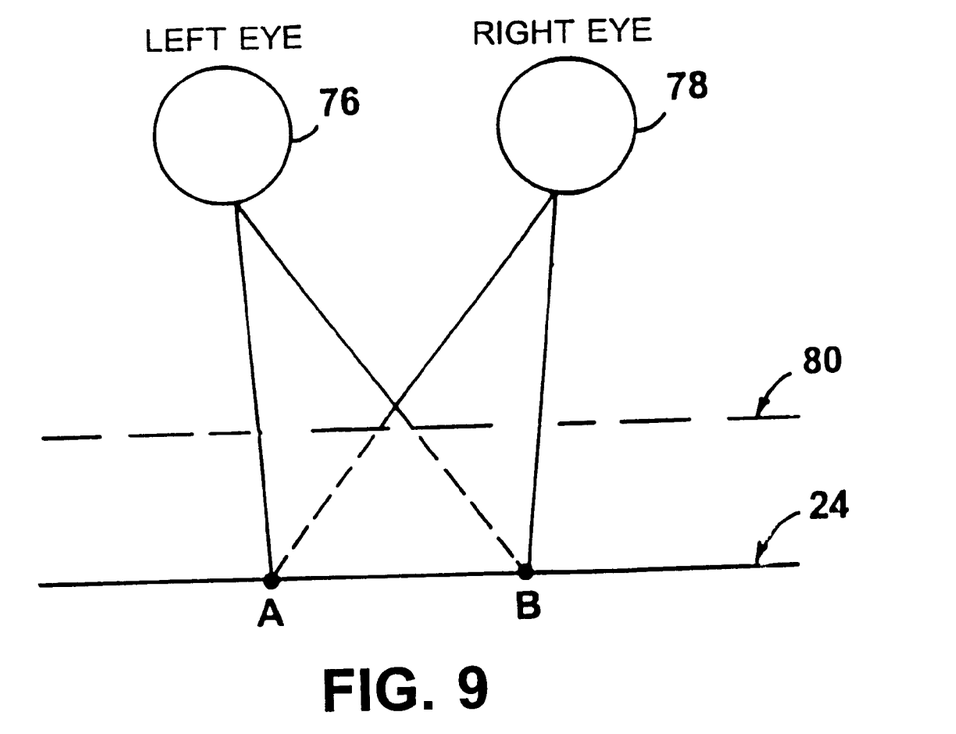
FIG. 9 is a diagram of a barrier strip layered over the flexible display element to provide stereoscopic effects.

Referring to FIG. 9, the display 12 can offer stereoscopic effects such as images that appear three-dimensional and images that alter their appearance based on viewing angle (e.g., a face that winks as a viewer moves the display). For example, an LCD barrier strip 80 (described in U.S. Pat. No. 5,315,377 to Isono, incorporated by reference) intersperses vision blocking barrier regions with viewing regions to control the image perceived by a viewer. By choosing appropriate underlying LCD image, the barrier strip 80 alters image appearance. As shown in FIG. 9, left eye 76 sees point A, but not point B, while right eye 80 sees point B, but not point A.

Figure 10:
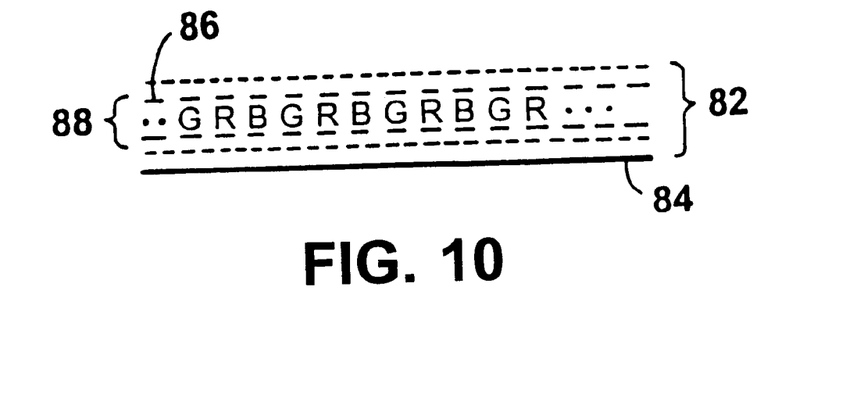
FIG. 10 is a diagram of a multi-color display.

Referring to FIG. 10, a filter layer 88 can add color to an otherwise monochromatic LCD display. The filter layer 88 may include color filters for red, green, and blue. A pixel 86 either blocks color filtered light or permits the color to illuminate a pixel 86. Though each pixel 86 only shows red, green, or blue, the viewer spatially integrates the colors to perceive combinations of the above colors (e.g., purple).

Other embodiments of the invention are within the following claims. E.g., other materials could be used for the flexible top layer and substrate, and a co-processor could be included in the device.

What is claimed is:

1. A wearable device, comprising:
   a flexible body configured and sized to secure around a wearer;
   at least one integrated circuit supported within the flexible body;
   a flexible display element supported within the flexible body; and
   circuitry to control the display element, the circuitry being supported within the flexible body and connecting the integrated circuit with the flexible display.

2. The device of claim 1, wherein the body comprises a strap.

3. The device of claim 1, wherein the body comprises one of the following: a wristband, an armband, an anklet, a belt, and a ring.

4. The device of claim 1, wherein the flexible display element is capable of continuing to display information when electrical power is removed from the display element.

5. The device of claim 1, further comprising a communication element for communication with the integrated circuit.

6. The device of claim 5, wherein the communication element comprises surface contacts.

7. The device of claim 5, wherein the communication element comprises a wireless communication element.

8. The device of claim 1, wherein the integrated circuit processes information to comply with smart card communication standards.

9. The device of claim 1, wherein the flexible body comprises at least one of the following flexible materials: plastic, paper, reinforced paper, and cardboard.

10. The device of claim 9, wherein the flexible body comprises at least one of the following flexible materials: polyvinyl chloride, polyester, ABS, and polycarbonate.

11. The device of claim 1, further comprising at least one additional information storage medium in addition to the integrated circuit.

12. The device of claim 1, further comprising a co-processor device.

13. The device of claim 1, further comprising a power source.

14. The device of claim 13, wherein the body facilitates power source replacement.

15. The device of claim 13, wherein the power source comprises a rechargeable power source.

16. The device of claim 13, further comprising a regulator and charge controller that recharges the power source.

17. The device of claim 13, further comprising a kickstart circuit that controls power output.

18. The device of claim 1, further comprising a speaker.

19. The device of claim 18, wherein the speaker comprises a piezoelectric speaker.

20. The device of claim 1, further comprising a microphone.

21. The device of claim 20, wherein the microphone comprises a piezoelectric microphone.

22. The device of claim 1, wherein the integrated circuit displays image information on the display element.

23. The device of claim 1, wherein the integrated circuit displays a sequence of images on the display element.

24. The device of claim 1, wherein the display element comprises a multi-color display.

25. The device of claim 1, wherein the display comprises a display that offers stereoscopic effects.

26. The device of claim 25, wherein the display incorporates a barrier strip to provide the stereoscopic effects.

27. The device of claim 1, further comprising input keys.

28. The device of claim 1, further comprising sensors.

29. The device of claim 28, wherein the sensors comprise sensors that acquire physiological data.

30. The device of claim 28, wherein the sensors comprise sensors that acquire pedometer data.

31. The device of claim 1, wherein the integrated circuit causes the display to display time information.

32. The device of claim 1, wherein the device comprises a waterproof construction.

33. The device of claim 7, wherein the device can display the contents of a cellular message service message.

34. The device of claim 1, wherein the display element is capable of continuing to display information when flexed.

* * * * *